United States Patent
Behrendt et al.

(10) Patent No.: US 10,409,654 B2
(45) Date of Patent: Sep. 10, 2019

(54) FACILITATING EVENT-DRIVEN PROCESSING USING UNIKERNELS

(71) Applicant: INTERNATIONAL BUSINESS MACHINES CORPORATION, Armonk, NY (US)

(72) Inventors: Michael Behrendt, Randersacker (DE); Daniel Federschmidt, Tuebingen (DE); Dominik Froehlich, Dossenheim (DE); Andreas Nauerz, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 15/648,848

(22) Filed: Jul. 13, 2017

(65) Prior Publication Data

US 2019/0018715 A1    Jan. 17, 2019

(51) Int. Cl.
*G06F 9/54* (2006.01)
*G06F 8/71* (2018.01)
*G06F 8/41* (2018.01)
*G06F 9/455* (2018.01)
*G06F 8/60* (2018.01)

(52) U.S. Cl.
CPC .............. *G06F 9/542* (2013.01); *G06F 8/41* (2013.01); *G06F 8/60* (2013.01); *G06F 8/71* (2013.01); *G06F 9/45533* (2013.01); *G06F 2009/45562* (2013.01)

(58) Field of Classification Search
CPC ... G06F 9/542; G06F 8/71; G06F 8/41; G06F 8/60; G06F 9/5077; G06F 2009/45562; G06F 9/4406; G06F 9/4416; G06F 11/1417; G06F 9/4403
See application file for complete search history.

(56) References Cited

U.S. PATENT DOCUMENTS 7,559,032 B2   7/2009   King et al.
7,904,886 B2   3/2011   Dufour et al.
(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).
(Continued)

*Primary Examiner* — Charles E Anya
(74) *Attorney, Agent, or Firm* — Michael A. Petrocelli, Esq.; Kevin P. Radigan, Esq.; Heslin Rothenberg Farley & Mesiti P.C.

(57) ABSTRACT

Event-driven processing is facilitated by a unikernel-based method which includes receiving, based on an event, a code execution request containing parameter values for an application code unikernel. The application code unikernel includes uploaded application code in a single-purpose virtual machine image. Based on receiving the code execution request, the application code unikernel is run, which includes providing the parameter values as bootvariables as part of booting the program code unikernel. Further, running the application code unikernel may include executing the application code unikernel directly on a hypervisor. The application code unikernel may include only operating system components required to run the uploaded application code.

17 Claims, 9 Drawing Sheets

(56) References Cited

U.S. PATENT DOCUMENTS

| | | | |
|---|---|---|---|
| 9,146,764 B1 | 9/2015 | Wagner | |
| 9,485,090 B2* | 11/2016 | Irvine | G06F 21/31 |
| 2011/0010714 A1* | 1/2011 | Powell | G06F 9/45533 718/1 |
| 2012/0089968 A1 | 4/2012 | Varadarajan et al. | |
| 2016/0092251 A1 | 3/2016 | Wagner | |
| 2016/0246960 A1 | 8/2016 | Chauvet et al. | |
| 2017/0155724 A1* | 6/2017 | Haddad | H04L 43/18 |
| 2018/0165110 A1* | 6/2018 | Htay | G06F 9/45558 |

OTHER PUBLICATIONS

International Business Machines Corporation (IBM), "z/Architecture Principles of Operation," IBM® Publication No. SA22-7832-10, Eleventh Edition, Mar. 2015 (pp. 1-1732).

International Business Machines Corporation (IBM), "Power ISA™ Version 2.07B," International Business Machines Corporation, Apr. 9, 2015 (pp. 1-1527).

Madhavapeddy, et al., "Jitsu: Just-In-Time Summoning of Unikernels", 12th USENIX Symposium on Networked Systems Design and Implementation (NSDL '15), May 2015 (15 pages).

Williams, Alex, "From Containers to Unikernels and Serverless Architectures", https://thenewstack.io/continuum-containers-unikernels-serverless-architectures/, Jan. 20, 2016 (6 pages).

Boston, "Event-Driven and Serverless Programming with OpenWhisk", https://developer.ibm.com/cities/events/event-driven-serverless-programming-openwhisk/, Jun. 23, 2016 (2 pages).

Baldini, et al.,"Tiered Model for Event-Based Serverless Computing", U.S. Appl. No. 15/291,051, filed Oct. 11, 2016 (44 pages).

Fink, et al., "Managing External Feeds in an Event-Based Computing System", U.S. Appl. No. 15/374,201, filed Dec. 6, 2016 (39 pages).

Cheng, et al., "Language-Independent Program Composition using Containers", U.S. Appl. No. 15/438,444, filed Feb. 21, 2017 (36 pages).

Fink, et al., "Facilitating Debugging Serverless Applications Via Graph Rewriting", U.S. Appl. No. 15/475,491, filed Mar. 31, 2017 (57 pages).

* cited by examiner

US 10,409,654 B2

FACILITATING EVENT-DRIVEN PROCESSING USING UNIKERNELS

BACKGROUND

Serverless computing refers to a computing model where the existence of servers is hidden from the program developer. Even though the servers exist, the developer is relieved from the need to consider the operation of the servers. For instance, the developer is relieved from the requirement to address low level infrastructural and operational details such as scalability, high-availability, infrastructure security, etc. Hence, serverless computing is essentially about reducing maintenance efforts to allow developers to focus on developing value-adding code. The serverless programming model encourages a simplified development of microservice-orientated solutions, often providing powerful primitives to decompose complex applications into small independent modules that can be exchanged and run on a serverless platform.

Currently, most serverless computing solutions rely on launching containers. Container-based data processing systems provide a way to run almost any application in an isolated manner within a container. A container may consist of an application, user-added files, and metadata for the application. Each container is built from a container image, which may specify what the container holds, what process to hold when the container is launched, and a variety of other configuration data. The container image is a read-only template from which the container is launched. The container image may consist of a series of layers. When a container image needs to be changed (for example, an application needs to be updated to a new version), a new layer may be built. Rather than replacing or entirely rebuilding the whole container image as may be done with a virtual machine, only that layer needs to be updated or added. In implementation, all containers share the same host kernel and the same operating system, which potentially weakens isolation. Additionally, support must be provided for different programming languages, as well as different versions of each of the programming languages. In particular, in a container-based data processing system, a container image is required for every supported programming runtime configuration, such as for each different version.

SUMMARY

Certain shortcomings of the prior art are overcome and additional advantages are provided through the provision of a computer program product for facilitating event-driven processing using unikernels. The computer program product includes a computer-readable storage medium readable by a processing circuit and storing instructions which, when executed, perform a method that includes receiving, based on an event, a code execution request containing parameter values for an application code unikernel. The application code unikernel includes uploaded program code in a single-purpose virtual machine image. Based on receiving the code execution request, the method includes running the application code unikernel, with the parameter values being provided as bootvariables as part of booting the application code unikernel.

Systems and computer-implemented methods relating to one or more aspects are also described and claimed herein. Further, services relating to one or more aspects may also be described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description and the specific example(s), while indicating aspects of the invention, are given by way of illustration only, and not by way of limitation. Various substitutions, modifications, additions, and/or rearrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for providing event-driven processing using unikernels.

The illustrative embodiments may be described using specific code, designs, architectures, protocols, layouts, schematics, or tools only as examples, and are not limiting to the illustrative embodiments. Furthermore, the illustrative embodiments are described in some instances using particular software, tools, and data processing environments only as an example for clarity of the description. The illustrative embodiments may be used in conjunction with other comparable or similarly purposed structures, systems, applications, or architectures. An illustrative embodiment may be implemented in hardware, software, or a combination thereof The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Figure 1A:
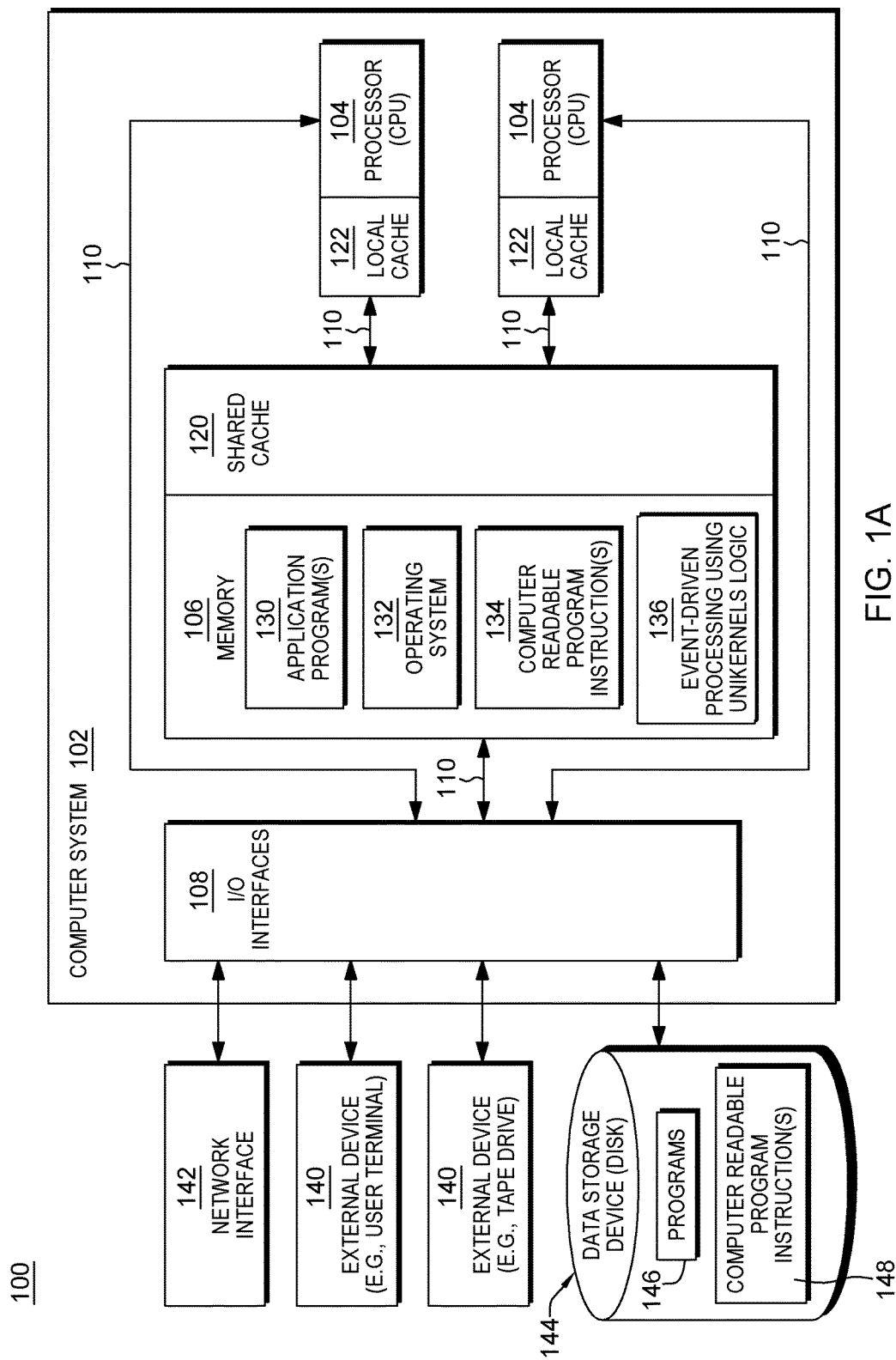
FIG. 1A depicts a block diagram of one embodiment of a computing environment which may implement processing or a processing environment, in accordance with one or more aspects of the present invention.

With reference to FIG. 1A, and as noted, this figure depicts a block diagram of a computing environment, in which one or more aspects of the present invention may be implemented. Computing environment 100 may be, or include, a computer, such as server, or other type of device, in which computer usable program code or instructions implementing one or more processes may be located for the illustrative embodiments.

In one example, computing environment 100 may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. z/ARCHITECTURE® is a registered trademark of International Business Machines Corporation, Armonk, N.Y., USA.

In another example, the computing environment may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA.

The data processing system may also be based on other architectures, including, but not limited to, the Intel x86 architectures. Other examples also exist.

As shown in FIG. 1A, computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Processor 104 includes a plurality of functional components used to execute instructions. These functional components include, for instance, an instruction fetch component to fetch instructions to be executed; an instruction decode unit to decode the fetched instructions and to obtain operands of the decoded instructions; instruction execution components to execute the decoded instructions; a memory access component to access memory for instruction execution, if necessary; and a write back component to provide the results of the executed instructions.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134, as well as serverless computing using unikernels logic 136 such as disclosed herein. Additionally, or alternatively computer readable program instructions 134 may be configured to carry out one or more other functions of certain embodiments of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of one or more aspects of the present invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As noted, the depicted example in FIG. 1A, and discussed above, is not meant to imply architectural limitations. For instance, computing environment 100 of FIG. 1A could also be a server, workstation, tablet computer, laptop computer, or other device.

Figure 1B:
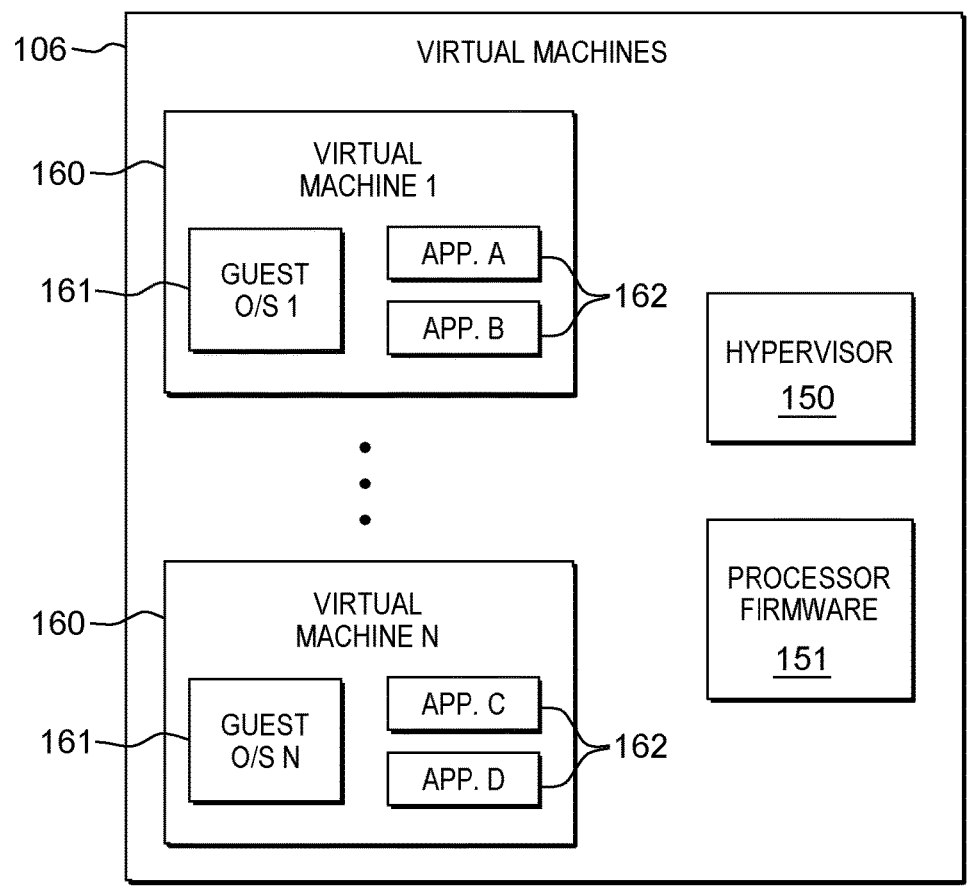
FIG. 1B depicts a block diagram of one embodiment of a memory of a computing environment such as depicted in FIG. 1A with virtual machines, aspects of which may be used in accordance with one or more aspects of the present invention.

As illustrated in FIG. 1B, memory 106 may include, for example, one or more virtual machines 160, a virtual machine manager, such as a hypervisor 150, that manages the virtual machines, and processor firmware 151. One example of hypervisor 150 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the computing environment's central processor complex provides the ability to operate large numbers of virtual machines 160, each capable of operating with different programs 162 and running a guest operating system 161, such as Linux™. Each virtual machine 160 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Memory 106 is coupled the processors, which are physical processor resources assignable to virtual machines. For instance, virtual machine 160 includes one or more logical processors, each of which represents all or a share of a physical processor resource that may be dynamically allocated to the virtual machine.

In one or more examples, the model of virtual machines may be a V=V model, in which the real or absolute memory of a virtual machine is backed by host virtual memory, instead of real or absolute memory. Each virtual machine has a contiguous virtual memory space. The physical resources are managed by host 150, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

Event-driven serverless computing is an area of interest in the field of cloud computing, and has the potential to become significant for cloud-native application development. For serverless platforms, it is advantageous to allow for quickly instantiating lightweight and short lived isolated environments on demand, and particularly environments that scale to accommodate the execution of user-provided code. This lighter aspect processing is a particular requirement when developing event-driven applications to quickly react on user- or machine-generated events and triggers which are only to be processed when needed. In such scenarios, it is important to react to spikes in traffic and to address requirements such as high availability, reliability and scalability without the need to maintain an overcapacity. As noted, from a technological point of view, most serverless computing solutions today rely on launching containers to satisfy the requirements noted above. Containers are constructed using a set of features in, for instance, the Linux® kernel (where Linux is a trademark or registered trademark of Linus Torvalds), which allow self-contained isolated environments to run on a shared host system. This approach is commonly referred to as operating system-level virtualization.

The above approach enables serverless models to rely on containers in order to support developing code in different languages by embedding the appropriate runtime into the container. This allows developers to reuse existing skills and develop code in a fit-for-purpose fashion. While containers allow for scaling and support different runtimes in a serverless runtime environment, they also introduce several potential drawbacks. These include run time overhead and resource efficiency issues, lack of isolation, a broad attack surface, build and turnaround time issues, and lack of immutability.

For instance, current container solutions require a full host system which has a container manager installed. In real life scenarios, the host is typically itself a virtual machine on a virtual machine manager, such as a type 1 or type 2 hypervisor. This imposes significant overhead on the central processing unit and memory, as well as increased use of disk space. Further, operating system-level virtualization methods (i.e., container-based methods) share the kernel and selected libraries and/or binaries between all containers. This potentially allows for interference between containers and requires extensive configuration in order to completely restrict security critical operations using security systems. In addition, due to the use of shared kernel facilities, containers typically expose a significant attack surface to a potential attacker who is able to execute arbitrary code in their container. Further, container images often have a size of over 200 MB for a simple web server. This size slows down build times, and development, as well as the distribution of build artifacts. Also, containers are conventionally developed on virtual machines, and can potentially alter the state of the virtual machine they are running on, which in practice may cause problems when the virtual machine is in prolonged use.

Disclosed herein, in one or more aspects, is an event-driven processing approach using unikernels rather than containers to implement a serverless platform for large scale untrusted code execution. A unikernel, which is sometime referred to as a library operating system, is a single purpose, single language and highly specialized virtual machine which can be hosted on a minimal computing environment, such as a virtual machine manager or hypervisor. Typically, when packaging an application (or program code) inside of a virtual machine, the resulting virtual machine image contains in addition to the application, a full featured guest operating system. This results in the image being potentially very large and slow to boot.

To build a unikernel packaged application, only those operating system components required for the application to run are compiled with the application code and configuration into a fixed-purpose image which can be run directly on a virtual machine manager, or hypervisor, without the need for a host or guest operating system. This enables isolation down to the hypervisor level, rather than the kernel level as is the case with container-based processing. Advantageously, the architecture disclosed herein for a serverless platform and runtime leverages unikernels to address the above-mentioned shortcomings of container-based technology in the serverless model, such as security, isolation and resource efficiency.

Disclosed herein, in one or more aspects, are a computer program product, system and computer-implemented method for running untrusted user code written in any of a variety of programming languages using unikernels for just-in-time provisioning of isolated runtime environments in the context of a serverless platform. Instead of provisioning containers such as described above, which provide the runtime and injecting the code along with the parameter values during execution, the unikernels disclosed herein allow running of untrusted user code in a self-contained, sealed and unprivileged environment directly on a virtual machine manager or hypervisor (such as a type 1 hypervisor). The hypervisor provides strong guarantee's on isolation on individual unikernel instances and mature tooling for resource management. Those skilled in the art will note from the discussion provided herein that improved provisioning processes are disclosed for isolated environments in serverless platforms, including in terms of latency, isolation, and security.

More generally, a computer program product, system, and computer-implemented method are provided for facilitating event-driven processing using unikernels. The method includes receiving, based on an event, a code execution request containing parameter values for an application code unikernel. The application code unikernel includes uploaded application code in a single-purpose virtual machine image. Based on receiving the code execution request, the application code unikernel is run, wherein the parameter values are provided as bootvariables as part of booting the application code unikernel. By way of example, in one or more implementations, based on receiving the code execution request, an invocation message may be generated containing the parameter values and a reference to the application code unikernel to be run. In this approach, based on generating the invocation request, the method may include running the application code unikernel, with the parameter values being provided as bootvariables as part of booting the application code unikernel.

In one or more implementations, the running of the application code unikernel includes executing the uploaded application code as part of booting the application code unikernel. Note that booting in this context refers to starting or initializing running of the application code unikernel. Further, the method may include shutting down the application code unikernel after the executing of the uploaded application code as part of booting of the application code unikernel. That is, in one or more implementations, running of the application code unikernel may be terminated as soon as the uploaded application code is run as part of booting the application code unikernel. This is particularly beneficial for event-driven applications, where the system needs to quickly react on user-or machine-generated events as triggers, and which are only processed when needed.

In one or more embodiments, the running of the application code unikernel may include executing the application code unikernel directly on a hypervisor. Further, the running of the application code unikernel may be controlled by an invoker, where the invoker is a privileged virtual machine image, also executing directly on the hypervisor. In one or more embodiments, the application code unikernel may include only operating system components required for the uploaded application code to run. That is, in one or more embodiments, the application code unikernel does not include a full guest operating system, but only portions or components of an operating system, needed for the application code to run.

In one or more implementations, the method further includes providing the application code unikernel. The providing may include compiling the uploaded application code and one or more operating system components within a virtual machine image to produce the single-purpose virtual machine image.

In one or more embodiments, the application code unikernel is a current version of the application code unikernel, and the method further includes determining whether an earlier version of the application code unikernel exists. Based on determining that the earlier version of the application code unikernel exists, the method may include replacing in storage the earlier version of the application code unikernel with the current version of the application code unikernel.

In one or more implementations, the uploaded application code may include untrusted user application code to perform an action in a serverless computing environment.

Figure 2:
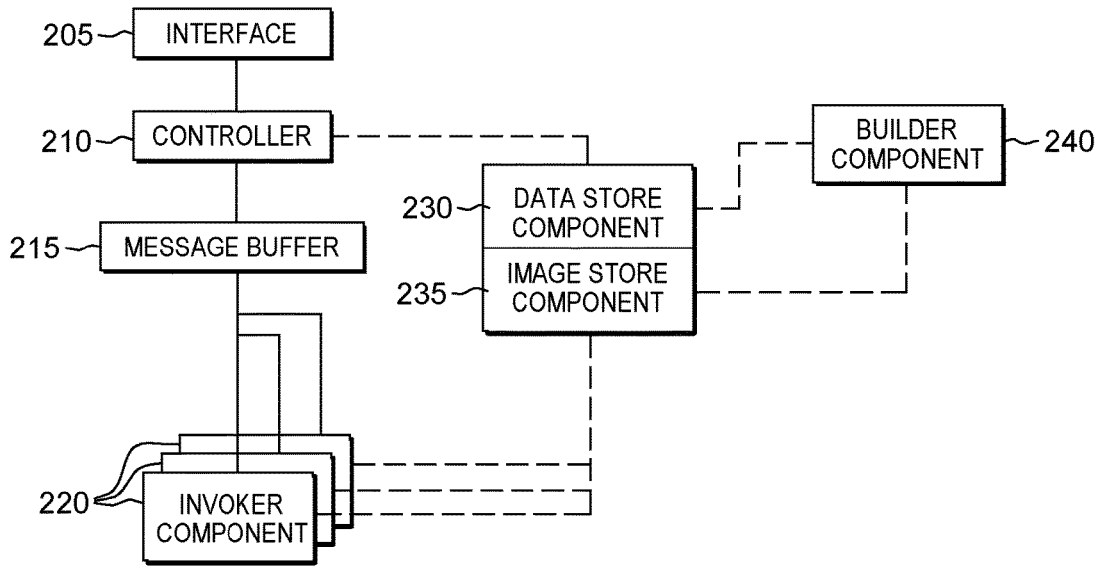
FIG. 2 depicts a block diagram of one embodiment of a computing system using unikernels, in accordance with one or more aspects of the present invention.

FIG. 2 depicts one embodiment of a computing system or environment using unikernels, such as in the context of serverless computing. The computing system, generally denoted 200, may execute on one or more systems, such as computing environment 100 of FIG. 1A described above. As discussed herein, a new method for building a system for scalable event driven execution of application code in different runtime environments is provided. In the example of FIG. 2, computing system 200 may be a serverless platform which, in one or more embodiments, may include an interface 205, a controller 210, a message buffer 215, invoker components 220, a data store component 230, an image store component 235, and a builder component 240. Note that component in this context may refer to a process sub-system and/or code module which facilitates performing the functions discussed.

Interface 205 may be any appropriate serverless platform interface that allows one or more users and/or machines to interface to the system for executing, based on events, application code. Interface 205 may be separate from or part of a controller 210 which provides an interface for uploading application code (or program code) to data store component 230. Data store component 230 may be a sub-system for storing application code (such as one or more routines) and metadata associated with the application code. In one or more embodiments, data store component 230 may generate events consumable by other components of the serverless platform or system. Image store component 235 is, in one or more embodiments, capable of storing binary virtual machine images and metadata associated with the application code. In one or more implementations, image store component 235 stores application code unikernel instances. Message buffer 215 may be capable of receiving messages and publishing the messages to a plurality of entities subscribed to the message buffer. A plurality of invoker components 220 are provided, where each invoker component may run, for instance, a type 1 hypervisor, along with a privileged virtual machine (invoker virtual machine) able to schedule startup and shutdown of other virtual machines (unikernels) on the hypervisor. Builder component 240 is able to subscribe to events from the data store component and build bootable, lightweight, custom virtual machine images leveraging a library operating system (unikernel) approach. Builder 240 is also, in one or more embodiments, capable of storing the virtual machine images in image store component 235.

By way of further explanation, to build an implementation of a unikernel-based serverless platform, a scalable and efficient unikernel builder component 240 may be employed. Because the compilation of a unikernel happens only during creation and/or update time for an individual action (i.e., an application code) it does not necessarily require sub-second execution times, but the builder component should be able to build the unikernel in a time range of, for instance, 5-10 seconds on the upper threshold to avoid negative experience for the user of the system. The builder component may also handle concurrent builds, and be scalable to a multi-machine setup where unikernels to be built are distributed across machines.

In advanced implementations, the build process may be provided as program code which is runnable on one or more invokers of the system itself, eliminating the need for separate builder component. In such a model, there may exist a number of system-invokers, which are reserved for running builds and possibly other system-internal program code.

The concept of an invoker component 220 is altered in accordance with the present invention from container-based invokers. In a container-based system, the invoker is a virtual machine deployed on a hypervisor running a container management engine, one privileged (invoker) container and a number of user code containers where program code is executed. In the context of the present invention, an invoker component is considered to be a host running a hypervisor in a privileged virtual machine responsible for managing the instantiation of unikernels.

Further, note that the data store component 230 may be extended to generate events when data is modified. The image store component 235 is added herein for storing built unikernel images.

The result is a different execution model than container-based serverless computing. Instead of having N recipes for every version of every supported runtime, each piece of application code uploaded is compiled into its own runnable deployment artifact. This results in N unikernel images where N is the number of application codes on the platform. Advanced implementations could leverage this property to include code analysis and security checks during the build phase of each application or program upload.

Figure 3:
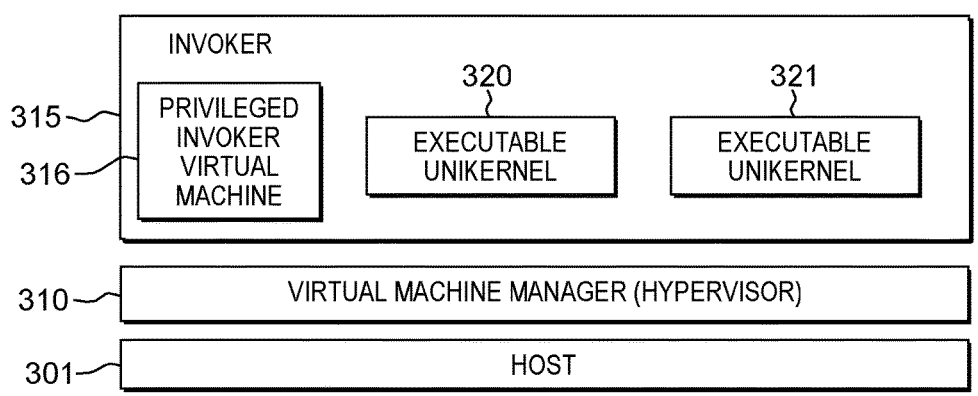
FIG. 3 is an architectural diagram of computing system layers for a computing system running unikernels, in accordance with one or more aspects of the present invention.

FIG. 3 depicts one embodiment of a computing architecture 300 of a system such as described above in connection with FIG. 2. As illustrated, a host 301 has a virtual machine manager or hypervisor 310 running thereon, on which an invoker component 315 runs. The invoker component includes, for instance, a privileged virtual machine 316 to facilitate scheduling the startup and tear down of other virtual machine images 320, 321. The other virtual machine images 320, 321 are executable unikernels, also referred to herein as application code unikernels. The architecture of FIG. 3 is a much simpler architectural stack for the invoker component compared with an invoker in the context of a container-based approach. In comparison, in a container-based approach, the invoker host on which a program code is executed is configured to use a container management engine to isolate the runtime environment. The container management engine provides interfaces for the creation of virtual environments i.e., containers that isolate processes, as well as resources. However, as noted above, in a container-based system, the containers share the same host kernel and the same operating system, which weakens isolation.

Figure 4:
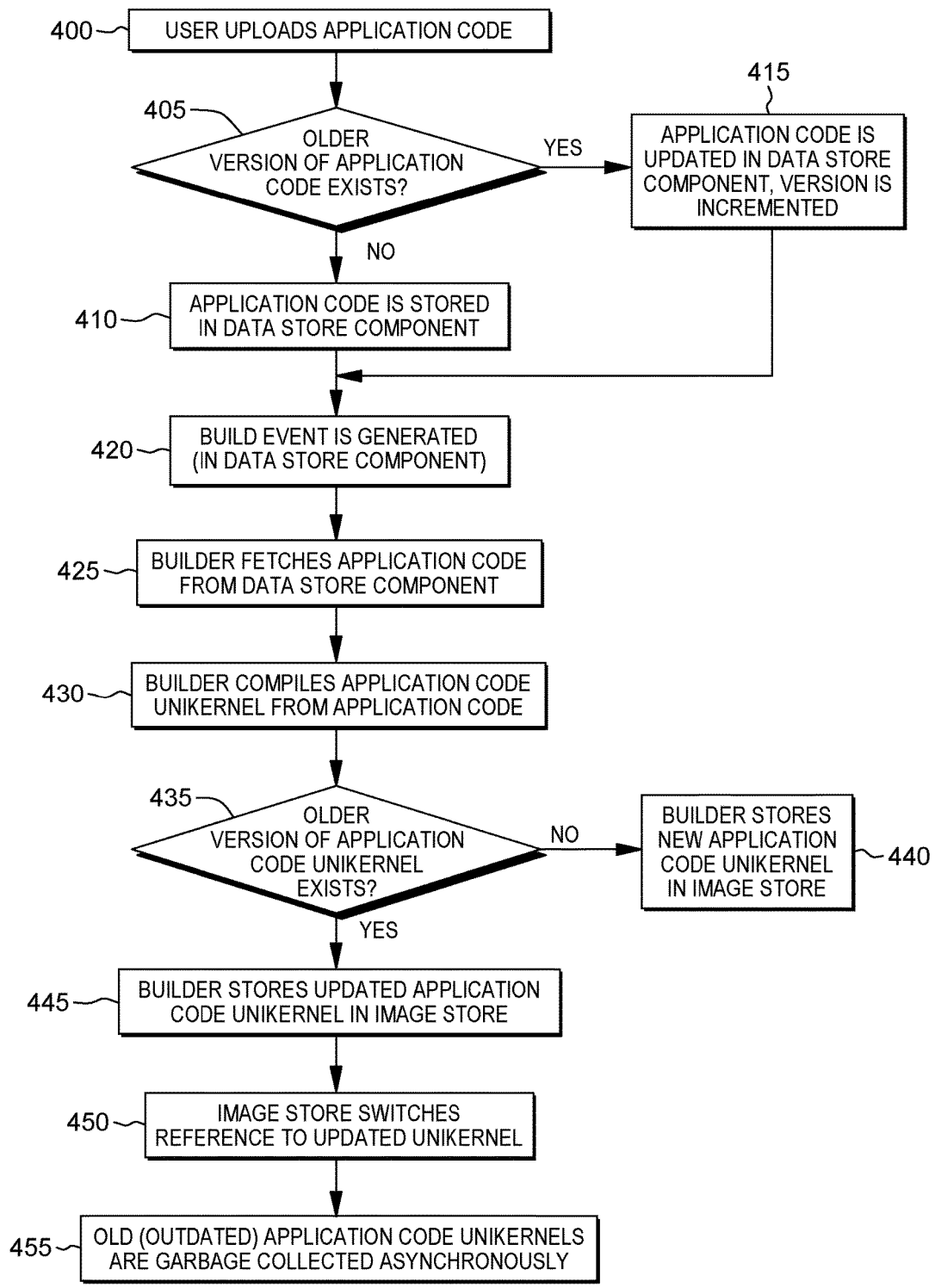
FIG. 4 depicts one embodiment of a process for providing an application code unikernel within a computing system such as depicted in FIG. 2, in accordance with one or more aspects of the present invention.

FIG. 4 depicts one embodiment of a process for providing an application code unikernel, in accordance with one or more aspects of the present invention. As illustrated, a user uploads application code 400 to the system, which determines whether an older version of the application code already exists within the system 405. If "no", then the application code is stored in a data store component 410. Otherwise, the application code is updated in the data store component, and the version indicator for that application code is incremented 415.

After the application code is uploaded to the data store component, a build event is generated to trigger the builder component to start a new compilation process 420. The builder component fetches the application code from the data store component 425 and compiles the application code unikernel from the uploaded application code. This includes an analysis of the application code to identify its dependencies and the use of required operating system functions or components. Based on that analysis, the application code is compiled together with its runtime and the previously identified dependencies (operating system components) into a lightweight bootable virtual machine image 430. The system determines whether an older version of the application code unikernel already exists 435. If "no", then the builder component stores the new application code unikernel in image store component 440. Otherwise, the builder component stores the updated application code unikernel in the image store component 445, and the image store component switches the unikernel reference to the updated unikernel 450. The old or outdated application code unikernel may then be garbage collected asynchronously 455 from the image store.

As explained herein, serverless platform processing is improved by, in part, compiling the user application code together with the runtime into a unikernel image. Since unikernels are very small and only contain the components necessary for the application to run, building unikernels is typically a matter of seconds. The model results in a 1:1 relation between unikernels and user application code (e.g., actions).

Figure 5:
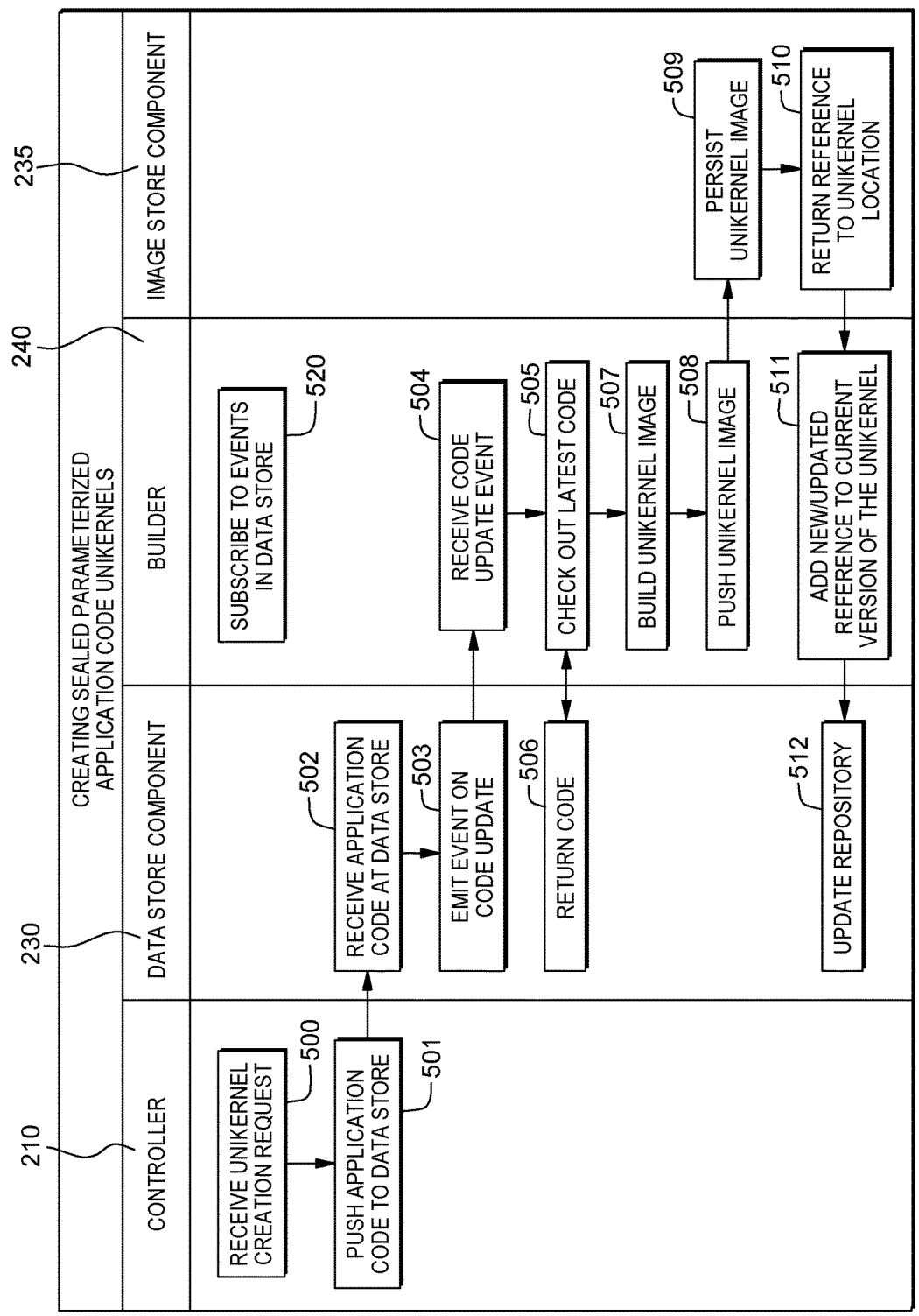
FIG. 5 depicts a further embodiment of a process for providing an application code unikernel within a computing system such as depicted in FIG. 2, in accordance with one or more aspects of the present invention.

FIG. 5 depicts a more detailed example of a process for building an application code unikernel, in accordance with one or more aspects of the present invention. Referring to FIGS. 2 and 5, a build of a new application code unikernel is triggered by controller 210 receiving a unikernel creation request 500 along with application code, which is pushed 501 by controller 210 to data store component 230. In particular, a build of a new application code unikernel is triggered whenever the application code (e.g., action code) is updated, for instance, by the user. To map application code to unikernel images, data store component 230 is used in conjunction with image store component 235. Upon receiving application code at the data store component, an event is generated on the code update 503, and a dedicated builder component or machine 240 (which subscribes to events in the data store 520) receives the code update event 504 and checks out the latest corresponding application code 505 from the repository, or data store component, as return code 506. Builder component 240 builds the unikernel by combining necessary operating system components with the required runtime and application code 507. When the build is finished, the resulting unikernel image artifact 508 is pushed to the image store component 235 for persistent storage 509, and a reference to the unikernel location 510 is returned to the builder to add a new or updated reference to the current version of the application code unikernel 511, and the data store component updates the application code repository 512 with the updated reference for the current version.

Advantageously, this model also allows for the integration of static code analysis and extensive type-checking during unikernel compilation in the builder component, for instance, to assign a quality score to every unikernel build, or to catch errors or identified malicious activity before actually executing the code. The flow of FIG. 5 may be employed to create a sealed, prioritized application code unikernel.

Figure 6:
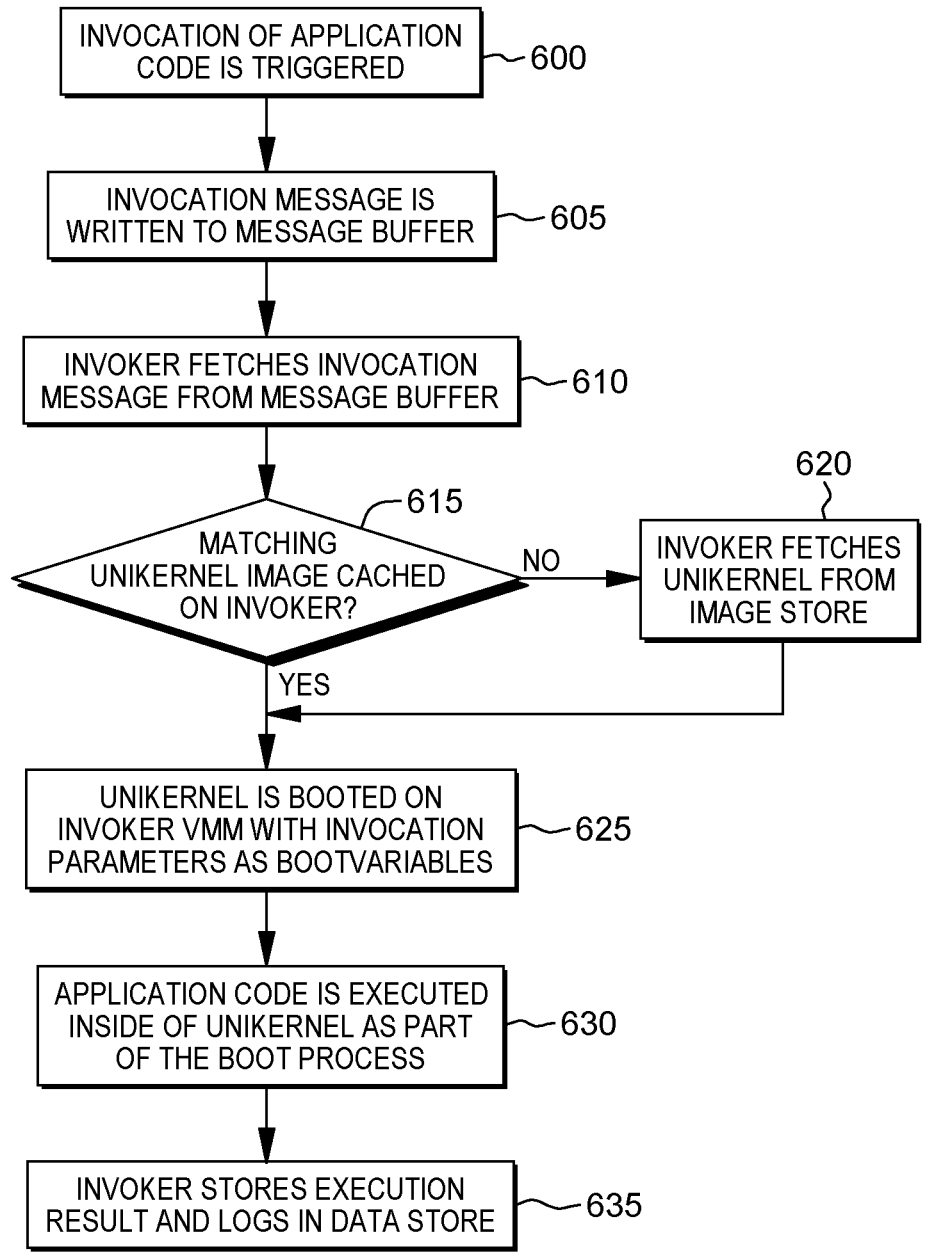
FIG. 6 depicts one embodiment of a process for running an application code unikernel in a computing system such as depicted in FIG. 2, in accordance with one or more aspects of the present invention.

FIG. 6 depicts one embodiment of a process for running an application code unikernel in a computing system. Once execution of application code is triggered 600 (e.g., by an event), an invocation message may be written or placed into the message buffer 605, which is then retrieved or fetched by an invoker component 610. Processing determines whether the application code unikernel (where the application code is compiled) is cached on the invoker 615. If "no", then the invoker fetches the application code unikernel from the image store 620. Once obtained, the invoker boots the application code unikernel on the hypervisor (virtual machine manager (VMM)), along with the parameter values received with the application code execution request 625. Because the unikernel contains only the bare minimum components required to execute the application code, its startup or boot time may be fast. The values of any parameters the application code might require to run are passed as bootvariables to the unikernel, and the application code is executed, for instance, as part of the boot process, eliminating the need for a separate communication after booting the execution environment to accept the execution context 630. The invoker then stores the execution result and logs in the data store component (in one or more implementations) 635.

Figure 7:
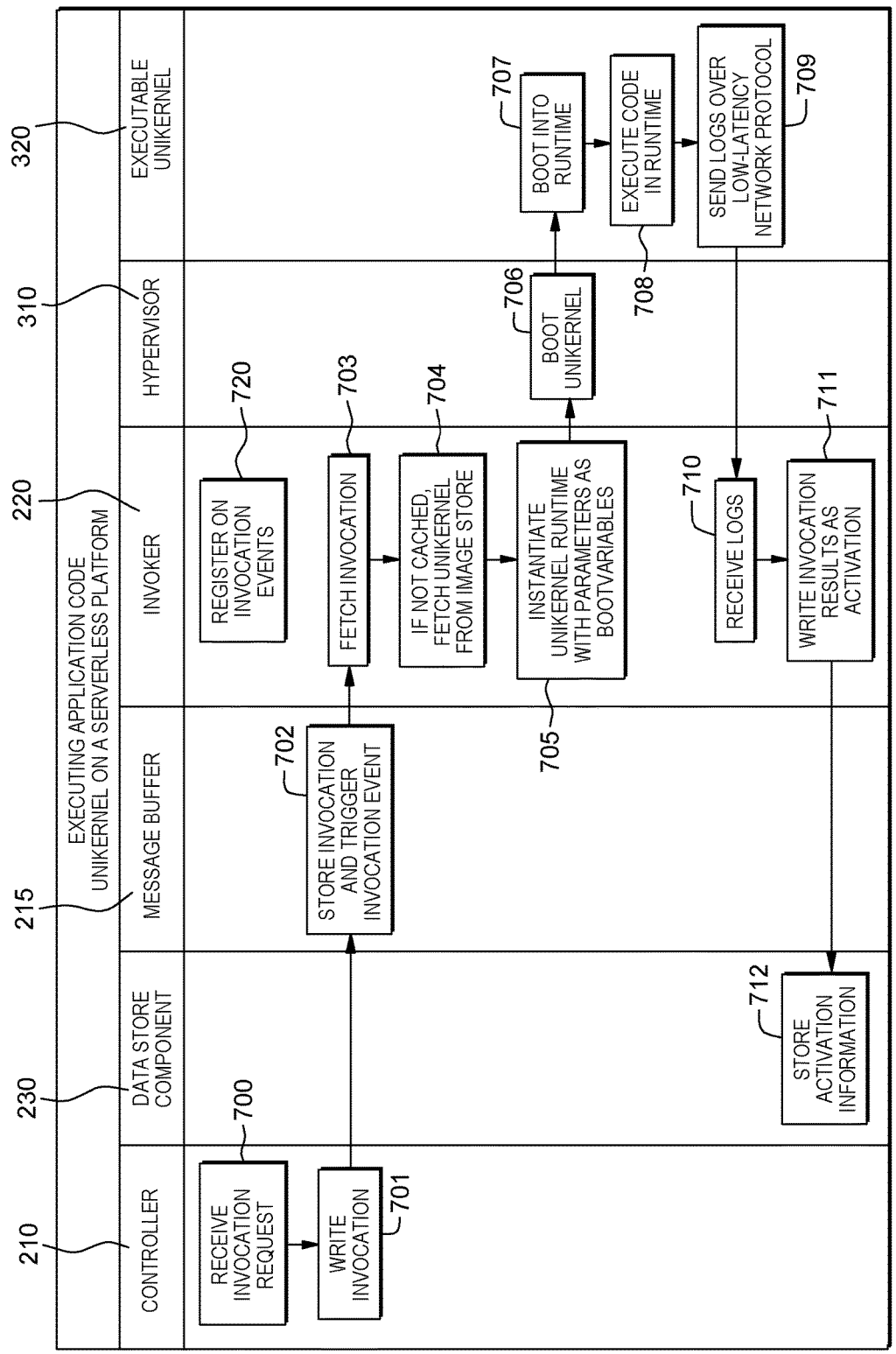
FIG. 7 depicts a further embodiment of a process for running an application code unikernel within a computing system such as depicted in FIG. 2, in accordance with one or more aspects of the present invention.

FIG. 7 depicts a more detailed embodiment of a process for fetching, instantiating, and executing an application code unikernel, in accordance with one or more aspects of the present invention. In this example, the controller 210, data store component 230, message buffer 215, and invoker 220 may refer to the computing system components of FIG. 2, while the hypervisor 310 and executing kernel 320 may refer to the computing architecture example of FIG. 3. When application code (i.e., an action) is to be executed, controller 210 receives an invocation request 700 and writes the invocation 701 to message buffer 215, which stores the invocation and triggers and invocation event 702. An invoker component 220 is registered to operate on invocation events 720, and fetches the invocation event 703. If the unikernel is not cached at that invoker, the unikernel is fetched from the image store 704, and the invoker instantiates the unikernel runtime with the application code parameters provided as bootvariables 705. Note that in one or more implementations, to further optimize the process, unikernel images may be cached on the invoker. Another possibility is to distribute unikernel images to a shared pool of invokers, that is, to provision a subset of all application code unikernel images to every invoker, and then to employ a locality-aware load-balancing algorithm to route requests to the appropriate invoker.

Once the unikernel runtime is substantiated, hypervisor 310 boots the unikernel 706, with the executing unikernel being booted into runtime 707 to allow the application code to execute in runtime 708. The execution results or logs may then be sent over a low-latency network protocol 709 back to the invoker, which receives the log 710, and writes the invocation results as activation information 711. The invoker returns the activation information to data store component 230, which stores the activation information 712. After obtaining the execution results or logs, the unikernel may be shut down. Potential improvements on this model could include not shutting down the unikernel after running the application code, but reusing the unikernel instance.

As explained herein, methods of creating, uploading and executing program code in a serverless system are provided. The serverless system may include, for instance, a data store capable of storing program code (routines) and metadata associated with the program code, and an image store storing binary virtual machine images and metadata associated with the virtual machine images, where the data store generates events consumable by other components. A controller may be provide as an interface for uploading the program code to the data store. A message buffer may be provided capable of receiving messages, and pushing the messages to a plurality of entities subscribed to the message buffer. A plurality of invoker components are provided, where each invoker component may run on a hypervisor, along with a privilege virtual machine which is configured to schedule the startup and teardown of other virtual machines on the hypervisor. A builder may be provided able to subscribe to events from the data store, and build bootable, lightweight, customized virtual machine images leveraging a library operating system (unikernel) approach. Further, the virtual machine images may be stored in the image store, which may either be part of the data store, or a separate component.

Those skilled in the art will note that in operation, the method may include: storing uploaded program code and associated metadata, such as the required runtime and parameterization of the uploaded application code in the data store; generating an event in the data store in response to the uploaded program code and associated metadata; creating a new, customized parameterized virtual machine image by the builder component, including the uploaded program code, necessary operating system component or functionality, and used libraries (unikernel) based on the associated metadata; receiving code execution requests from external sources containing values for parameters of the uploaded program code; handling the parameterized request for program code execution by generating invocation messages containing the information about parameter values and the customized virtual machine image to be started and delivering the invocation messages to invokers over the message buffer; and running the customized virtual machine images by the invoker in response to invocation messages, wherein parameter values are provided when booting the customized virtual machine image.

Those skilled in the art will also note from the above discussion that provided herein is an improved serverless computing environment or platform. Isolation is facilitated through lightweight, specialized virtual machine images leveraging hypercall interfaces instead of full host operating systems, restricting execution context through operating system features such as namespaces and cgroups. Because of the different approach take to virtualize the untrusted guest environment, isolation security is increased. The attach surface in terms of utilities and tools available to a potentially malicious program code, are much more limited in an implementation such as described herein. Additionally, the model disclosed above allows for higher density of executions on the same hardware, because of the reduction of operational overhead in comparison to a container-based approach such as summarized herein.

Advantageously, each application code is compiled at creation time into a deployable, parameterizable unikernel virtual machine image, which can be leveraged to improve performance and resource efficiency.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
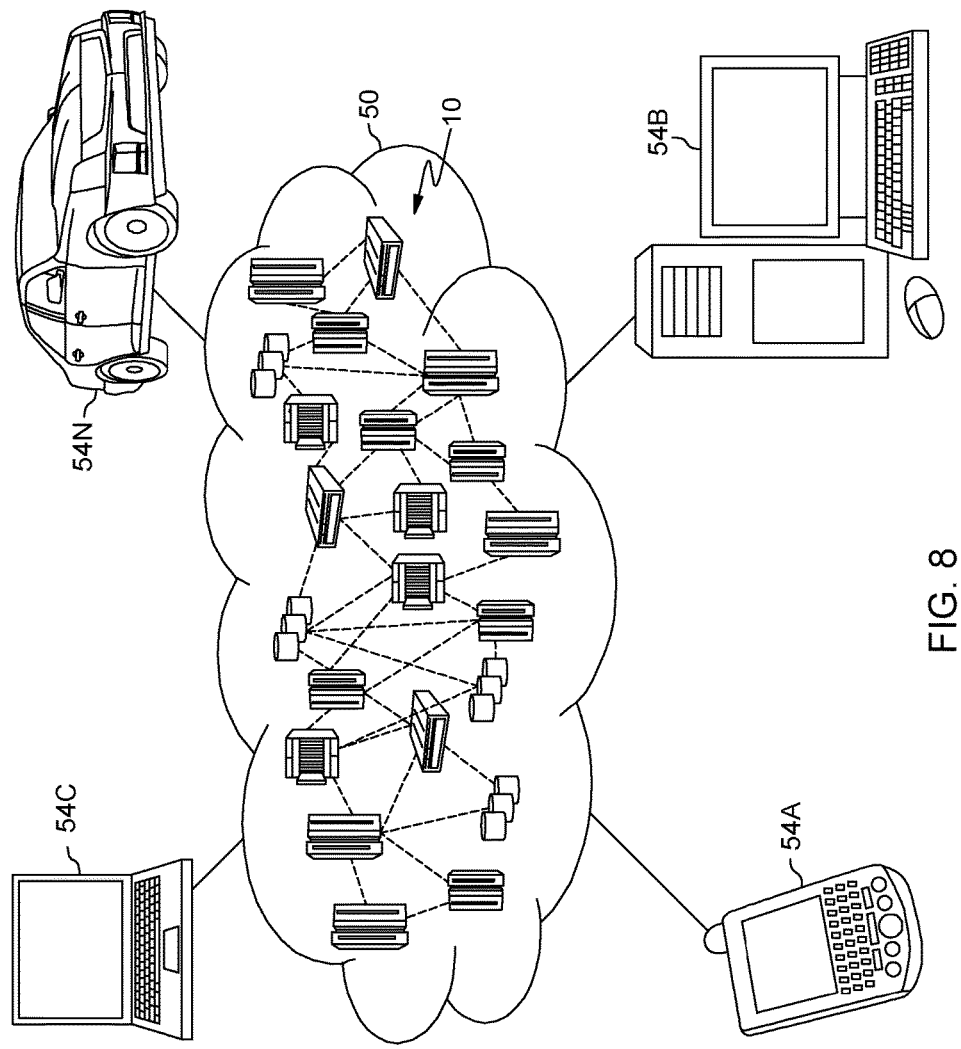
FIG. 8 depicts one embodiment of a cloud computing environment which may facilitate implementing, or be used in association with, one or more aspects of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
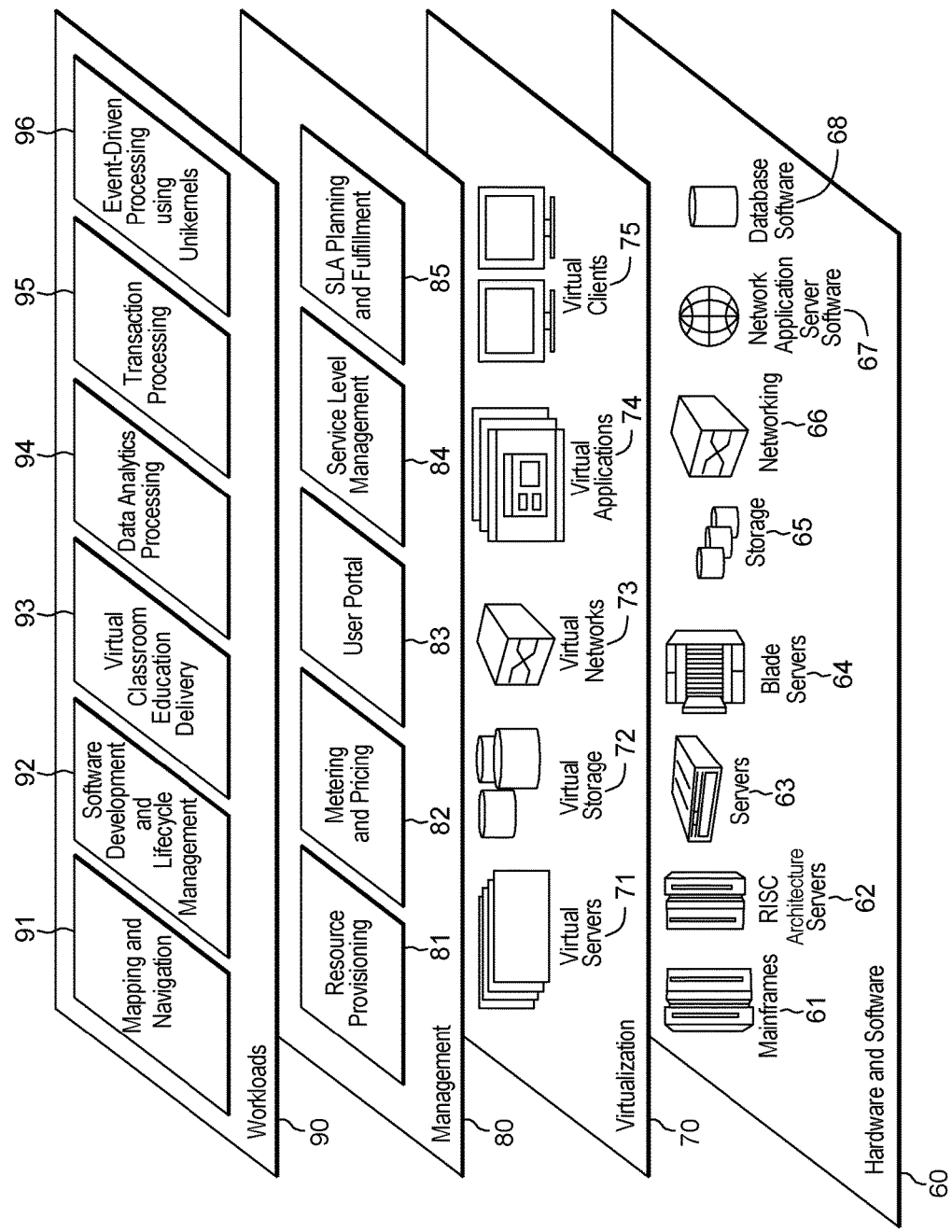
FIG. 9 depicts an example of extraction model layers, which may facilitate implementing serverless computing using unikernels processing, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event-driven processing using unikernels 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used, if desired.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating event-driven processing using unikernels, the computer program product comprising:
   a non-transitory computer readable storage medium readable by a processing circuit and storing instructions which, when executed, perform a method comprising:
   based on a user uploading an application code, determining whether an existing version of the application code is stored in a data store component, the uploaded application code comprising untrusted user application code;
   based on the existing version being stored in the data store component, updating the existing version using the uploaded application code, otherwise storing the uploaded application code in the data store component;
   based on the updating or storing, performing, by a build component, a build event from the stored application code stored in the data store component, the build event comprising compiling an application code unikernel with runtime and previously identified dependencies into a single-purpose virtual machine image and storing the application code unikernel in an image store component, wherein the build event includes integrating static code analysis and extensive type-checking while compiling the unikernel during the build event in order to facilitate detecting malicious activity prior to executing the untrusted user application code, and wherein the build component is configured to accommodate concurrent build events, and wherein the build event is performed within a time range threshold;

receiving, based on an event, a code execution request containing parameter values for the application code unikernel, wherein the application code unikernel is sealed and parameterized to facilitate running the untrusted user application code, wherein the application code unikernel comprises the stored application code in the single-purpose virtual machine image; and based on receiving the code execution request, initiating running the application code unikernel, wherein the initiating running includes booting, by an invoker, the application code unikernel on a virtual machine manager, the invoker being a privileged virtual machine image, wherein the parameter values are provided as bootvariables as part of booting the application code unikernel, and the stored application code is executed as part of a boot process for the application code unikernel, and wherein the stored application code uses during execution the parameter values provided as the bootvariables.

2. The computer program product of claim 1, further comprising shutting down the application code unikernel after the executing of the stored application code as part of the booting of the application code unikernel.

3. The computer program product of claim 1, further comprising executing the application code unikernel directly on the virtual machine manager, the virtual machine manager comprising a hypervisor.

4. The computer program product of claim 3, wherein the initiating running of the application code unikernel is controlled by an invoker, the invoker being a privileged virtual machine image executing directly on the hypervisor.

5. The computer program product of claim 3, wherein the application code unikernel comprises only operating system components required for the stored application code to run.

6. The computer program product of claim 1, further comprising providing the application code unikernel, the providing including compiling the stored application code and one or more operating system components within a virtual machine image to produce the single-purpose virtual machine image, the one or more operating system components being less than a full operating system.

7. The computer program product of claim 1, wherein the application code unikernel is a current version of the application code unikernel, and wherein the method further comprises determining whether an earlier version of the application code unikernel exists, and based on determining that the earlier version of the application code unikernel exists, replacing in storage the earlier version of the application code unikernel with the current version of the application code unikernel.

8. The computer program product of claim 1, wherein based on receiving the code execution request, the method further comprises generating an invocation message containing the parameter values and a reference to the application code unikernel to be run, and wherein based on generating the invocation message, proceeding with the running of the application code unikernel.

9. A system of facilitating event-driven processing using unikernels, the system comprising:
  a memory; and
  a processing circuit communicatively coupled with the memory, wherein the system performs a method comprising:
    based on a user uploading an application code, determining whether an existing version of the application code is stored in a data store component, the uploaded application code comprising untrusted user application code;
    based on the existing version being stored in the data store component, updating the existing version using the uploaded application code, otherwise storing the uploaded application code in the data store component;
    based on the updating or storing, performing, by a build component, a build event from the stored application code stored in the data store component, the build event comprising compiling an application code unikernel with runtime and previously identified dependencies into a single-purpose virtual machine image and storing the application code unikernel in an image store component, wherein the build event includes integrating static code analysis and extensive type-checking while compiling the unikernel during the build event in order to facilitate detecting malicious activity prior to executing the untrusted user application code, and wherein the build component is configured to accommodate concurrent build events, and wherein the build event is performed within a time range threshold;
    receiving, based on an event, a code execution request containing parameter values for the application code unikernel, wherein the application code unikernel is sealed and parameterized to facilitate running the untrusted user application code, wherein the application code unikernel comprises the stored application code in the single-purpose virtual machine image; and
    based on receiving the code execution request, initiating running the application code unikernel, wherein the initiating running includes booting, by an invoker, the application code unikernel on a virtual machine manager, the invoker being a privileged virtual machine image, wherein the parameter values are provided as bootvariables as part of booting the application code unikernel, and the stored application code is executed as part of a boot process for the application code unikernel, and wherein the stored application code uses during execution the parameter values provided as the bootvariables.

10. The system of claim 9, further comprising shutting down the application code unikernel after the executing of the stored application code as part of the booting of the application code unikernel.

11. The system of claim 9, further comprising executing the application code unikernel directly on the virtual machine manager, the virtual machine manager comprising a hypervisor.

12. The system of claim 11, wherein the initiating running of the application code unikernel is controlled by an invoker, the invoker being a privileged virtual machine image-executing directly on the hypervisor.

13. The system of claim 11, wherein the application code unikernel comprises only operating system components required for the stored application code to run.

14. The system of claim 9, further comprising providing the application code unikernel, the providing including compiling the stored application code and one or more operating system components within a virtual machine image to produce the single-purpose virtual machine image, the one or more operating system components being less than a full operating system.

15. A computer-implemented method of facilitating event-driven processing using unikernels, the computer-implemented method comprising:
- based on a user uploading an application code, determining whether an existing version of the application code is stored in a data store component, the uploaded application code comprising untrusted user application code;
- based on the existing version being stored in the data store component, updating the existing version using the uploaded application code, otherwise storing the uploaded application code in the data store component;
- based on the updating or storing, performing, by a build component, a build event from the stored application code stored in the data store component, the build event comprising compiling an application code unikernel with runtime and previously identified dependencies into a single-purpose virtual machine image and storing the application code unikernel in an image store component, wherein the build event includes integrating static code analysis and extensive type-checking while compiling the unikernel during the build event in order to facilitate detecting malicious activity prior to executing the untrusted user application code, and wherein the build component is configured to accommodate concurrent build events, and wherein the build event is performed within a time range threshold;
- receiving, based on an event, a code execution request containing parameter values for the application code unikernel, wherein the application code unikernel is sealed and parameterized to facilitate running the untrusted user application code, wherein the application code unikernel comprises the stored application code in the single-purpose virtual machine image; and
- based on receiving the code execution request, initiating running the application code unikernel, wherein the initiating running includes booting, by an invoker, the application code unikernel on a virtual machine manager, the invoker being a privileged virtual machine image, wherein the parameter values are provided as bootvariables as part of booting the application code unikernel, and the stored application code is executed as part of a boot process for the application code unikernel, and wherein the stored application code using uses during execution the parameter values provided as the bootvariables.

16. The computer-implemented method of claim 15, further comprising executing the application code unikernel directly on the virtual machine manager, the virtual machine manager comprising a hypervisor.

17. The computer-implemented method of claim 16, wherein the application code unikernel comprises only operating system components required for the stored application code to run.

* * * * *